United States Patent
Burström

(10) Patent No.: US 8,136,649 B2
(45) Date of Patent: Mar. 20, 2012

(54) WEAR-RESISTANT LINING

(75) Inventor: Anders Burström, Malmö (SE)

(73) Assignee: Metso Minerals (Wear Protection) AB, Trelleborg (SE)

( * ) Notice: Subject to any disclaimer, the term of this patent is extended or adjusted under 35 U.S.C. 154(b) by 532 days.

(21) Appl. No.: 11/921,686

(22) PCT Filed: Jun. 5, 2006

(86) PCT No.: PCT/SE2006/000668
§ 371 (c)(1), (2), (4) Date: Dec. 31, 2008

(87) PCT Pub. No.: WO2006/132582
PCT Pub. Date: Dec. 14, 2006

(65) Prior Publication Data
US 2009/0173595 A1    Jul. 9, 2009

(30) Foreign Application Priority Data
Jun. 7, 2005 (SE) ........................... 0501308

(51) Int. Cl.
B65G 11/10 (2006.01)
B65G 11/16 (2006.01)
(52) U.S. Cl. ..................... 193/25 E; 193/2 R
(58) Field of Classification Search .......... 193/25; 428/908.8
See application file for complete search history.

(56) References Cited

U.S. PATENT DOCUMENTS

| | | | |
|---|---|---|---|
| 1,584,295 A * | 5/1926 | Hoff | 110/171 |
| 2,155,215 A * | 4/1939 | Beament | 148/522 |
| 3,378,209 A | 4/1968 | Crocheron | |
| 3,460,305 A * | 8/1969 | Long | 52/604 |
| 3,607,606 A | 9/1971 | Beninga | |
| 3,607,607 A * | 9/1971 | Beninga et al. | 428/49 |
| 3,867,239 A * | 2/1975 | Alesi et al. | 428/48 |
| 3,949,943 A * | 4/1976 | Schuler et al. | 241/183 |

(Continued)

FOREIGN PATENT DOCUMENTS

DE    4344600 A1    3/1995

(Continued)

OTHER PUBLICATIONS

Official Search Report of The European Patent Office in counterpart foreign Application No. 06747861.0 filed Jun. 7, 2005.

Primary Examiner — Gene Crawford
Assistant Examiner — William R Harp
(74) Attorney, Agent, or Firm — Kinney & Lange, P.A.

(57) ABSTRACT

A wear-resistant lining element (1) for a surface subjected to wear has an outwardly directed surface (4) over which material in the form of pieces or particles, such as crushed ore and crushed rock material, is intended to move. The wear-resistant lining element also has a thickness (d). The wear-resistant lining element (1) comprises elastomeric material (2) mainly adapted to absorb impact energy and wear-resistant members (3) mainly adapted to resist wear. The wear-resistant members (3) are in a plane (P) perpendicular to the outwardly directed surface (4) designed so that in the direction of thickness (d) they at least partially overlap each other. Moreover, a wear-resistant lining made of a number of wear-resistant lining elements (1) is disclosed.

7 Claims, 3 Drawing Sheets

U.S. PATENT DOCUMENTS

| | | | | |
|---|---|---|---|---|
| 4,073,318 A | * | 2/1978 | Close et al. | 138/149 |
| 4,077,575 A | * | 3/1978 | Tillmanns | 241/285.2 |
| 4,162,900 A | | 7/1979 | Judd | |
| 4,179,979 A | * | 12/1979 | Cook et al. | 89/36.02 |
| 4,241,457 A | * | 12/1980 | Klein et al. | 2/2.5 |
| 4,290,761 A | * | 9/1981 | Suginaka | 474/190 |
| 4,638,684 A | | 1/1987 | Maucher | |
| 4,761,317 A | | 8/1988 | Ebata et al. | |
| 4,855,174 A | * | 8/1989 | Kawamoto | 428/67 |
| 5,055,336 A | * | 10/1991 | Davis | 428/137 |
| 5,109,970 A | * | 5/1992 | Zaborszki | 193/2 R |
| 5,328,776 A | * | 7/1994 | Garber et al. | 428/614 |
| 5,705,250 A | * | 1/1998 | Hudson, Jr. | 428/99 |
| 5,915,528 A | * | 6/1999 | Shmuelov | 2/2.5 |
| 7,261,945 B2 | * | 8/2007 | Biermann et al. | 428/469 |
| 7,793,579 B1 | * | 9/2010 | Lee | 89/36.02 |

FOREIGN PATENT DOCUMENTS

| | | |
|---|---|---|
| EP | 0239660 A1 | 10/1987 |
| GB | 1248802 A | 10/1971 |
| GB | 1487527 A | 10/1977 |
| GB | 2107288 A | 4/1983 |
| WO | WO 03082711 A1 | 10/2003 |

* cited by examiner

WEAR-RESISTANT LINING

FIELD OF THE INVENTION

The present invention relates to a wear-resistant lining element which is intended for a surface subjected to wear and which has an outwardly directed surface, over which material in the form of pieces or particles, such as crushed ore and crushed rock material, is intended to move, and a thickness, the wear-resistant lining element comprising elastomeric material mainly adapted to absorb impact energy and wear-resistant members mainly adapted to resist wear. The invention also relates to a wear-resistant lining made of such wear-resistant lining elements.

BACKGROUND ART

Wear-resistant linings are known and used both in chutes and on truck platforms for protecting the base. They usually consist of natural or synthetic rubber and are to protect from hard impacts by rocks and wear exerted by material moving over and in contact with the surface of the wear-resistant lining element. Relatively soft rubber materials provide good resistance to wear, but to prevent hard impacts from breaking through the wear-resistant lining element, this must be given a great thickness. Harder rubber materials provide better protection from impacts, but are more susceptible to abrasive wear.

To solve this problem, wear-resistant lining elements have been developed, in which different materials are combined in the outwardly directed surface of the element. Examples of such wear-resistant lining elements are to be found in U.S. Pat. No. 3,607,606, where ceramic bodies are embedded in a rubber material. The ceramic bodies have a high resistance to wear while the rubber material serves as shock absorber to reduce the risk of the brittle ceramic bodies cracking when hit by pieces of material. In this type of wear-resistant lining elements, there is a risk that the different materials are separated from each other. In case of hard impacts, there is also still a risk that the wear-resistant members will crack.

SUMMARY OF THE INVENTION

The object of the present invention is to provide a wear-resistant lining element and a wear-resistant lining which solve the above problem.

A special object is to provide a wear-resistant lining element and a wear-resistant lining which resist hard impacts.

A further object is to provide a wear-resistant lining element and a wear-resistant lining where the wear-resistant members have a reduced tendency to separate from the elastomeric material.

According to the invention, these objects are now achieved by a wear-resistant lining element having the features as defined in the claims.

In the inventive wear-resistant lining element, the wear-resistant members are, in a plane perpendicular to the outwardly directed surface, designed so that in the direction of thickness they at least partially overlap each other. In this way, forces exerted by impacts on the wear-resistant lining element may be distributed over a plurality of wear-resistant members, which reduces the risk of cracking.

The wear-resistant members are advantageously made of a ceramic material. Such materials have good wear resistance and can easily be formed to the desired shape.

The wear-resistant members can be arranged in rows in the outwardly directed surface. In this way, impact forces can easily be distributed in the lateral direction over different wear-resistant members, and it is also easy to automate the positioning of the wear-resistant members when manufacturing the wear-resistant lining element.

In one embodiment of the invention, the wear-resistant members have in the plane perpendicular to the outwardly directed surface a bottle-like shape with a narrow neck portion and a wide bottom portion, juxtaposed wear-resistant members being arranged alternately with the neck portion upwards and downwards in the direction of thickness. Such an arrangement provides good distribution of forces and the wear-resistant members are particularly safely mounted in the elastomeric material.

In another embodiment, the wear-resistant members are in the plane perpendicular to the outwardly directed surface trapezoidal with a narrow end and a thick end, juxtaposed wear-resistant members being arranged alternately with the narrow end upwards and downwards in the direction of thickness. This is an alternative way of providing a good distribution of forces.

In yet another embodiment of the invention, the wear-resistant members have in the plane perpendicular to the outwardly directed surface the shape of an oblique parallelogram with two sides inclined relative to the direction of thickness, juxtaposed wear-resistant members being arranged each with one of the sides inclined relative to the direction of thickness parallel to each other. This is another practical way of ensuring a good distribution of forces.

In a further embodiment, the wear-resistant members have in the plane perpendicular to the outwardly directed surface the shape of a T with a leg portion and a head portion, juxtaposed wear-resistant members being arranged alternately with the head portion upwards and downwards in the direction of thickness. This is also a way of providing a good distribution of forces over the wear-resistant members.

The wear-resistant members are advantageously arranged in rows, every second wear-resistant member being offset relative to the neighbouring wear-resistant members in the same row. In the outwardly directed surface, a brickwork structure will thus be obtained, which prevents local wear along straight lines, by making it possible to distribute impact forces over a plurality of neighbouring wear-resistant members.

The outwardly directed surface of the wear-resistant lining element advantageously consists mainly of the wear-resistant members. This increases the probability that a rock or the like hitting the wear-resistant lining element hits the wear-resistant members, not the elastomeric material. The wear surface of the wear-resistant elements is generally adapted to be exposed in the outwardly directed surface during use.

The inventive wear-resistant lining is made of a number of inventive wear-resistant lining elements. The wear-resistant lining thus provides good protection from impacts and wear.

BRIEF DESCRIPTION OF THE DRAWINGS

The invention will now be described in more detail by way of example and with reference to the accompanying schematic drawings, in which.

DESCRIPTION OF PREFERRED EMBODIMENTS

Figure 1:
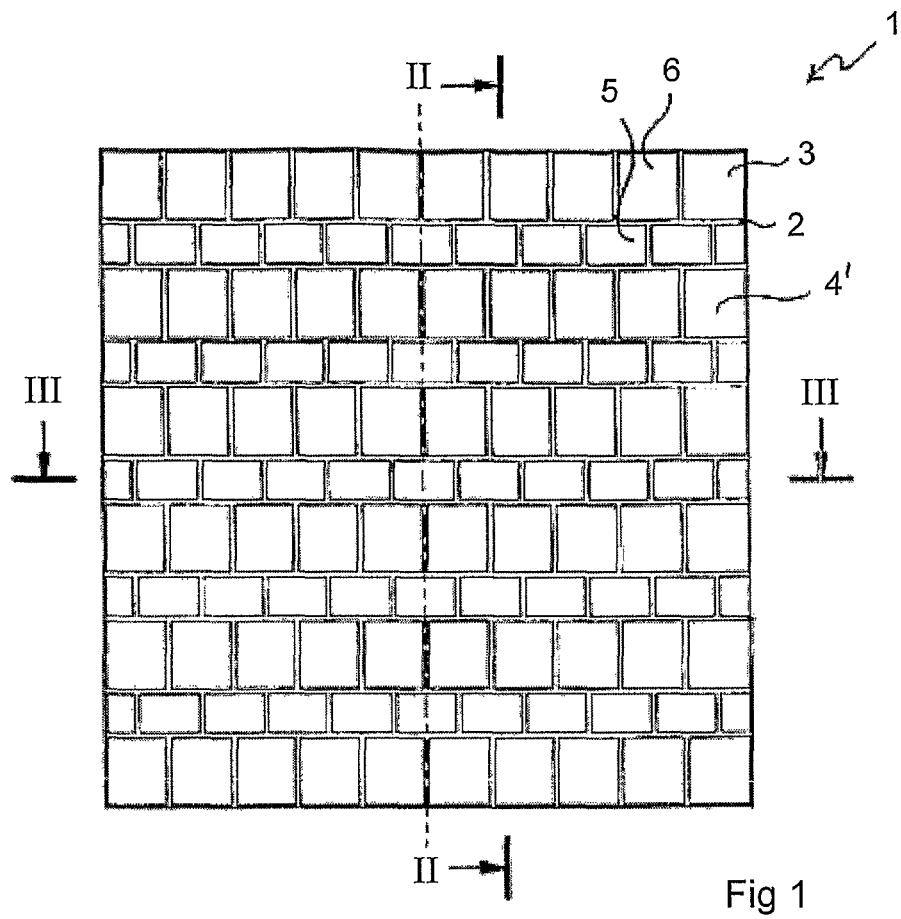
FIG. 1 is a top plan view of a wear-resistant lining element according to the invention.
Figure 2:
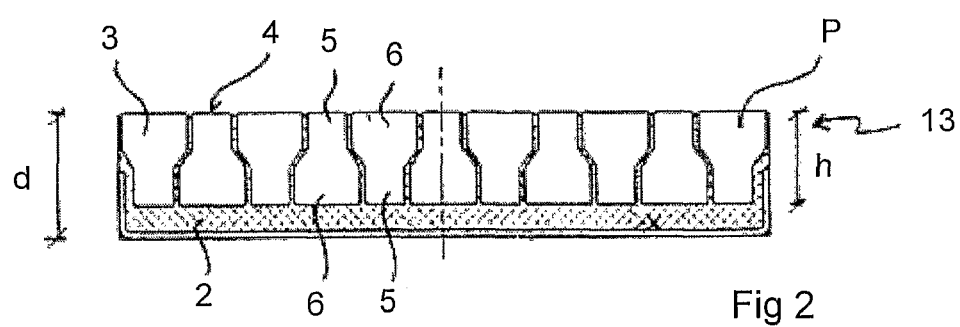
FIG. 2 is a sectional view taken along line II-II.
Figure 8:
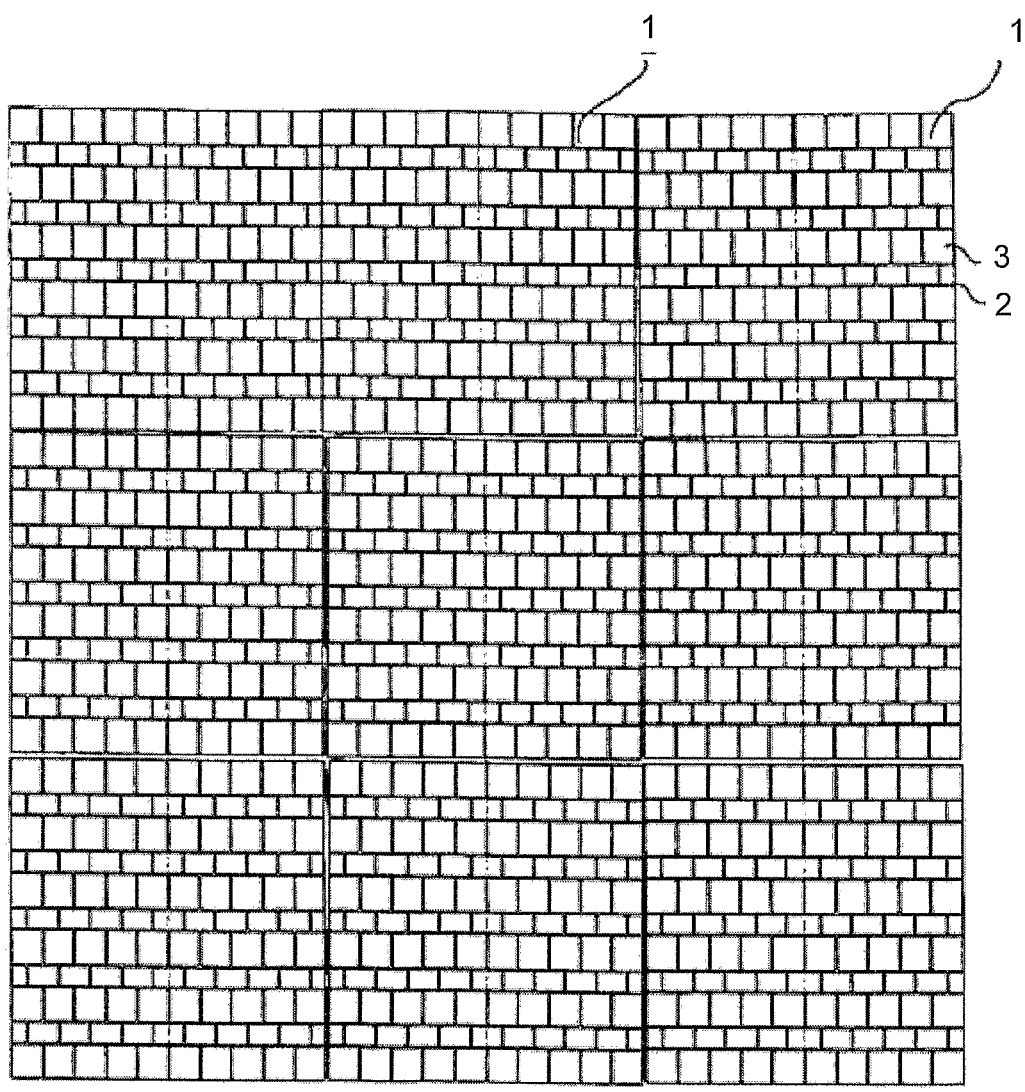
FIG. 8 is a top plan view of a wear-resistant lining made of plurality of wear-resistant lining elements according to FIG. 1.

The wear-resistant lining element 1 shown in FIG. 1 consists of a core 2 of rubber, in which wear-resistant members 3 are embedded at the surface 4 which in the mounted state of the wear-resistant lining element 1 is directed outwards. "Embedded" could in this context imply "fully embedded" but generally refers to the situation shown in FIGS. 2 and 3, where one surface of the wear-resistant members 3 essentially forms a part of the surface 4, while the remainder of each member 3 is immersed in the core 2. The wear-resistant lining element 1 is adapted to be mounted on a wall subjected to wear. When a plurality of wear-resistant lining elements 1 are mounted side by side on the wall, they constitute a wear-resistant lining, see FIG. 8. As is evident from FIG. 2, the wear-resistant members 3 have in a plane P perpendicular to the outwardly directed surface 4 a bottle-like shape with a narrow neck portion 5 and a wide bottom portion 6. The wear-resistant members 3 are arranged side by side, alternately with the neck portion 5 and the bottom portion 6 in the outwardly directed surface 4.

Figure 4:
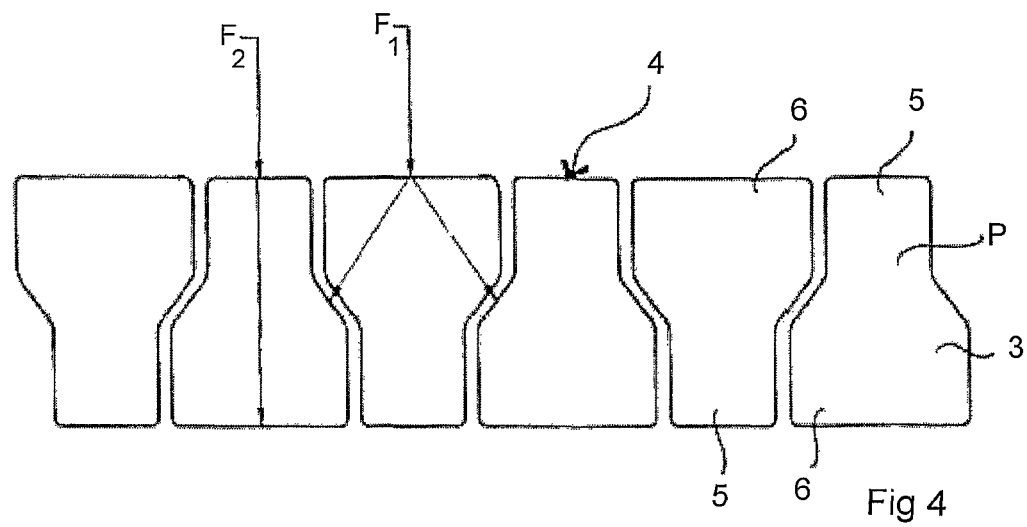
FIG. 4 is a sectional view of a number of wear-resistant members in the wear-resistant lining element in FIG. 1 according to a first embodiment.

If a stone hits one of the wear-resistant members 3 having the bottom portion 6 oriented towards the outwardly directed surface 4, the force of the hit will, as indicated by the arrow $F_1$ in FIG. 4, be distributed also over the two neighbouring wear-resistant members 3. However, if the stone should hit one of the wear-resistant members 3 having the neck portion 5 oriented towards the outwardly directed surface 4, the force will not be distributed but only go straight down through the wear-resistant lining element, as indicated by the arrow $F_2$. In most cases however, the stones hitting the wear-resistant lining 1 are so large relative to the wear-resistant members 3 that they hit more than one wear-resistant member 3, which means that the force will be distributed over a plurality of wear-resistant members 3. This reduces the risk of wear-resistant members cracking when being hit, also in heavy-duty applications. In addition, experiments have shown that the bottle-shaped wear-resistant members 3 are very safely mounted in the rubber material. Not until the wear-resistant members 3 have been worn down to approximately half the height h, they will start falling out of the rubber material.

If, besides, the wear-resistant members 3 are arranged in such a brickwork pattern, with rows 13 substantially parallel to the sectional line II-II with every second wear-resistant member 3 offset, in the outwardly directed surface 4 as illustrated in FIG. 1, a hit on one of the wear-resistant members 3 having the bottom portion 6 in the outwardly directed surface 4 will in fact be distributed not only over two neighbouring wear-resistant members 3 but over four neighbouring wear-resistant members 3. This further reduces the risk that the wear-resistant members 3 will crack. The offset rows also reduce the risk of local wear along straight lines.

Figure 5:
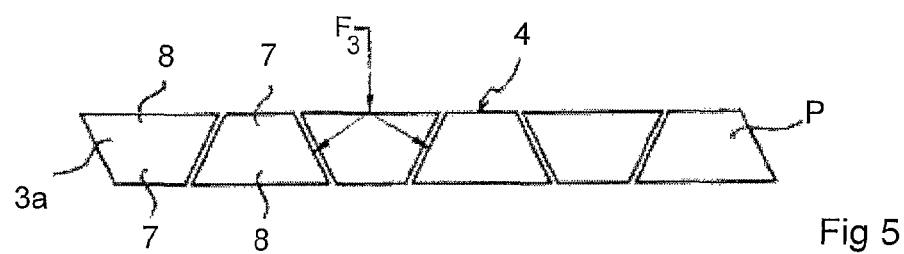
FIG. 5 is a sectional view of wear-resistant members according to a second embodiment of the invention.

FIG. 5 shows an alternative design of wear-resistant members 3a. These wear-resistant members 3a are in the plane P trapezoidal and embedded in the rubber material alternately with a narrow end 7 and a thick end 8 towards the outwardly directed surface 4. Also in this design, forces of hitting will be distributed over the two neighbouring wear-resistant members 3a if the hit occurs on one of the wear-resistant members 3a having the thick end 8 in the outwardly directed surface 4 (arrow $F_3$), whereas any hits on wear-resistant members 3a having the narrow end 7a in the outwardly directed surface 4 only go straight down through the wear-resistant lining element 1. However, like in the embodiment illustrated in FIG. 4, the stones hitting the wear-resistant lining element 1 will in general be so large relative to the wear-resistant members 3a that they hit a plurality of wear-resistant members 3a at the same time.

Figure 6:
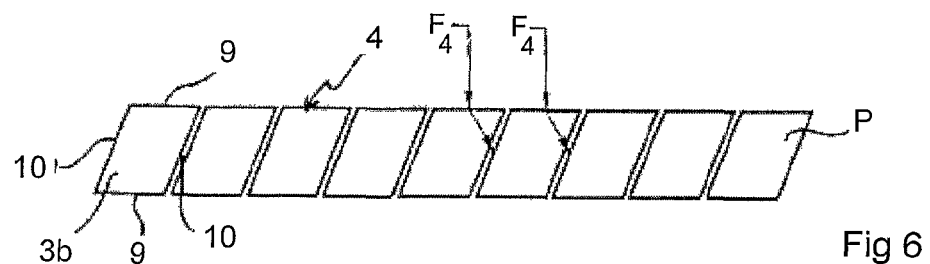
FIG. 6 is a sectional view of wear-resistant members according to a third embodiment of the invention.

FIG. 6 illustrates another embodiment of wear-resistant members 3b which in the plane P have the shape of an oblique parallelogram with plane surfaces 9 parallel to the outwardly directed surface 4 and oblique surfaces 10 which are inclined relative to the direction of thickness d. The wear-resistant members 3b are arranged side by side with the oblique surfaces of neighbouring wear-resistant members 3b parallel to each other. When a wear-resistant member 3b is hit, for instance, by a stone, the force will be spread, as indicated by the arrow $F_4$, to one of the neighbouring wear-resistant members 3b. In the design of the wear-resistant members 3b as illustrated in FIG. 6, a distribution of forces will thus always occur, but only to one neighbouring wear-resistant member 3b.

Figure 7:
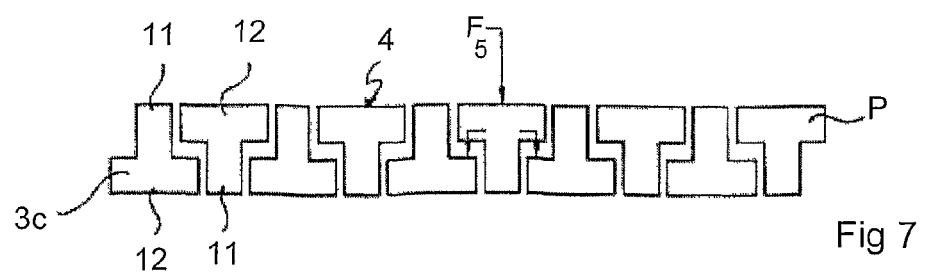
FIG. 7 is a sectional view of wear-resistant members according to a fourth embodiment of the invention.

FIG. 7 illustrates a fourth embodiment of wear-resistant members 3c. These wear-resistant members 3c are in the plane P T-shaped and have a leg portion 11 and a head portion 12. The wear-resistant members 3c are arranged side by side alternately with the leg portion 11 and the head portion 12 in the outwardly directed surface 4. The behaviour when being hit will resemble that of the wear-resistant members 3 in FIG. 4 and the wear-resistant members 3a in FIG. 5, that is if a stone hits one of the wear-resistant members 3c having the head portion 12 in the outwardly directed surface 4, the force will be distributed over the two neighbouring wear-resistant members (arrow $F_5$), whereas the force hitting a wear-resistant member 3c with the leg portion 11 in the outwardly directed surface 4 only goes down through the hit wear-resistant member 3c. However, as described with reference to FIGS. 4 and 5, the stones hitting the wear-resistant members 3c will in general be so large relative to the wear-resistant members 3c that they hit a plurality of wear-resistant members 3c at the same time.

In the shown Example, the wear-resistant lining element 1 has a thickness d of 65 mm and the wear-resistant members 3 a height h of 38 mm. This wear-resistant lining element 1 is adapted to heavy-duty applications. With greater stress, the wear-resistant lining element 1 may be given, for instance, a thickness d of 95 mm, in which case the wear-resistant members may be given a height h of 70 mm. However, if the wear-resistant lining element 1 should be used for less stress, both the thickness d of the element 1 and the height h of the wear-resistant members can be chosen to be smaller.

It will be appreciated that many modifications of the above-described embodiments of the invention are conceivable within the scope of the invention, which is defined in the appended claims.

For instance, the wear-resistant members can be made of other materials than ceramic materials. All materials with good resistance to sliding wear can be used, such as corundum and other mineral materials, as well as steel and other metal materials.

The elastomeric material which constitutes the core 2 of the wear-resistant lining element 1 can be both natural rubber and some synthetic material, for instance polyurethane.

It should be noted that, in the context of this invention, wall refers, of course, not only to more or less vertical walls but also to horizontal walls, such as floors and roofs, and walls of any inclination. The inventive wear-resistant lining element can thus be used, for instance, for truck platforms and chutes, both for the side walls and for the bottom.

The wear-resistant member shapes described above are only examples of conceivable shapes. A person skilled in the art understands that also other shapes are possible, as long as they allow an overlap in the thickness direction of the wear-resistant lining element, whereby the forces of hitting can be distributed. Basically it is possible to use any shape that can be arranged alternately with a narrow portion directed upwards and a wide portion directed downwards and, respectively, a wide portion directed upwards and a narrow portion directed downwards. As shown in FIG. 6, the shape need not necessarily be mirror-symmetrical around the thickness direction of the wear-resistant lining element, but may also be given an inclined symmetry. An advantage of such an arrangement is that irrespective of which wear-resistant member is hit, a distribution of forces always occurs, so that not only the hit wear-resistant member is subjected to a load. A drawback is, however, that the force is always distributed to only one neighbouring wear-resistant member, whereas in the mirror-symmetrical case the force will be distributed to two neighbouring wear-resistant members.

Also other shapes of wear-resistant members are conceivable. For example, the wear-resistant members could be given an L shape, corresponding to halves of the T-shaped wear-resistant members 3c shown in FIG. 7. The L-shaped wear-resistant members would conveniently be arranged with the leg of the L alternately directed upwards and downwards. Such a design and arrangement would imply that if a wear-resistant member with the leg of the L directed downwards is hit, the force of hitting would be distributed to a neighbouring wear-resistant member. If, however, a wear-resistant member with the leg of the L directed upwards is hit, no distribution of forces occurs to neighbouring wear-resistant members.

Figure 3:
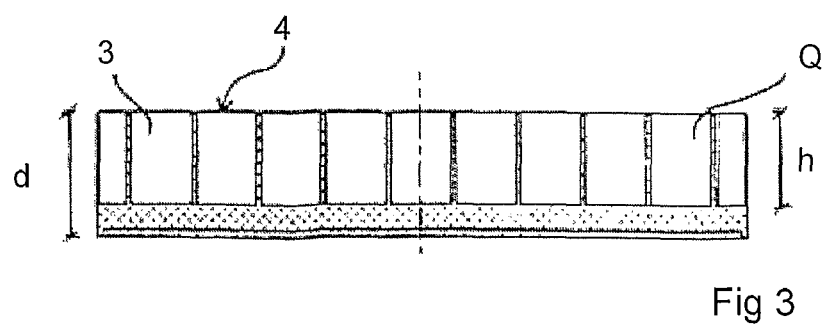
FIG. 3 is a sectional view taken along line III-III.

In the Examples shown, the wear-resistant members 3, 3a, 3b, 3c are only designed to overlap in one plane, while as shown in FIG. 3 they are parallel to each other in the plane Q extending at right angles to the outwardly directed surface 4 and the plane P. However, it is also possible to design the wear-resistant members 3, 3a, 3b, 3c so that in the direction of thickness d they partially overlap also in the plane Q.

As shown in FIG. 1, the wear-resistant members 3 are arranged in rows 13 with every second wear-resistant member 3 offset, but a person skilled in the art realises that also other arrangements are possible. For instance, the wear-resistant members could be arranged in straight rows.

As shown in FIG. 1 each wear-resistant member 3; 3a; 3b; 3c has a wear surface 4' forming a part of the outwardly directed surface 4 constituting the wear surface of the wear-resistant lining element 1.

As discussed above the wear-resistant members 3; 3a; 3b; 3c are embedded in the elastomeric material of the lining element 1.

The wear-resistant lining element 1 has been described above in connection with lining of walls for chutes, truck platforms and the like. Wear-resistant surfaces with wear-resistant members 3, 3a, 3b, 3c of the type described above may, however, be used also in other contexts. They can be used, for instance, to increase the wear resistance of screens. The wear-resistant members can then be incorporated in the surface of the screen, between the screen openings. The wear-resistant lining elements can also be designed as protruding bars between the screen openings, referred to as skid bars or rider bars. Each bar may then be provided with one or more rows of wear-resistant members. Such bars can also be arranged on wear-resistant linings for walls.

The invention claimed is:

1. A wear-resistant lining element which is intended for a surface subjected to wear and which has an outwardly directed surface, over which material in the form of pieces or particles, such as crushed ore and crushed rock material is intended to move, and which has a thickness, the wear-resistant lining element comprising:
   elastomeric material mainly adapted to absorb impact energy; and
   wear-resistant members mainly adapted to resist wear,
   wherein the wear-resistant members in a plane perpendicular to the outwardly directed surface are designed so that in the direction of the thickness they at least partially overlap each other, have a bottle-like shape with a neck portion and a bottom portion, and are arranged alternately with the neck portion upwards and downwards, the bottom portion being wider than the neck portion.

2. A wear-resistant lining element as claimed in claim 1, in which the wear-resistant members are made of a ceramic material.

3. A wear-resistant lining element as claimed in claim 1, in which the wear-resistant members are arranged in rows in the outwardly directed surface.

4. A wear-resistant lining element as claimed in claim 1, in which the outwardly directed surface mainly consists of the wear-resistant members.

5. A wear-resistant lining element as claimed in claim 1, wherein each wear-resistant member has a wear surface forming a part of the outwardly directed surface constituting a wear surface of the wear-resistant lining element.

6. A wear-resistant lining element as claimed in claim 1, wherein the wear-resistant members are embedded in the elastomeric material of the lining element.

7. A wear-resistant lining for a wall subjected to wear, over which material in the form of pieces or particles, such as crushed ore and crushed rock material is intended to move, which wear-resistant lining is made of a number of wear-resistant lining elements, the wear-resistant lining elements comprising:
   elastomeric material mainly adapted to absorb impact energy; and
   wear-resistant members mainly adapted to resist wear, wherein the wear-resistant members in a plane perpendicular to the outwardly directed surface are designed so that in the direction of the thickness they at least partially overlap each other and are aranged alternately with a first portion directed upwards and a second portion directed downwards and, respectively, the second portion directed upwards and the first portion directed downwards, said second portion being wider than said first portion.

* * * * *

UNITED STATES PATENT AND TRADEMARK OFFICE
CERTIFICATE OF CORRECTION

| | | |
|---|---|---|
| PATENT NO. | : 8,136,649 B2 | Page 1 of 1 |
| APPLICATION NO. | : 11/921686 | |
| DATED | : March 20, 2012 | |
| INVENTOR(S) | : Anders Burstrom | |

It is certified that error appears in the above-identified patent and that said Letters Patent is hereby corrected as shown below:

Col. 6, Line 55
  Delete "aranged"
  Insert --arranged--

Signed and Sealed this
Twelfth Day of March, 2013

Teresa Stanek Rea
*Acting Director of the United States Patent and Trademark Office*